United States Patent [19]

Mutoh et al.

[11] Patent Number: 5,023,538
[45] Date of Patent: Jun. 11, 1991

[54] PWM INVERTER APPARATUS FOR CONTROLLING ROTATING MAGNETIC FLUX IN A.C. MOTORS

[75] Inventors: Nobuyoshi Mutoh, Katsuta; Keijiro Sakai, Hitachiota; Akiteru Ueda, Ibaraki; Hiroshi Fujii, Chiba, all of Japan

[73] Assignee: Hitachi, Ltd., Tokyo, Japan

[21] Appl. No.: 380,039

[22] Filed: Jul. 14, 1989

[30] Foreign Application Priority Data

Jul. 19, 1988 [JP] Japan .................................. 63-179763

[51] Int. Cl.$^5$ .............................................. H02A 7/42
[52] U.S. Cl. .................................... 318/811; 318/807; 318/809
[58] Field of Search ............... 318/811, 802, 801, 803, 318/807, 809

[56] References Cited

U.S. PATENT DOCUMENTS 4,477,763 10/1984 Asano et al. ........................ 318/811

Primary Examiner—William M. Shoop, Jr.
Assistant Examiner—John W. Cabeca
Attorney, Agent, or Firm—Antonelli, Terry, Stout & Kraus

[57] ABSTRACT

A PWM inverter apparatus used for driving an a.c. motor, including an inverter having an output part connected to the a.c. motor and switching elements on-off controlled by a PWM signal. The inverter apparatus also includes a part for receiving, at an interval of a given sampling period, status command information specifying a desired status of a vector of a rotating magnetic flux in the a.c. motor; a part for predicting, on the basis of at least the status command information received at each sampling time, the status of the vector of the rotating magnetic flux which will be produced at a next sampling time; a part for calculating a difference vector between the status of the vector of the rotating magnetic flux specified by the status command information received at a present sampling time and the predicted status of the vector of the rotating magnetic flux which will be produced at a next sampling time; a part for synthesizing the difference vector using selected reference voltage vectors from among a plurality of predetermined reference voltage vectors; and a part for generating a PWM signal for controlling the switching elements of the inverter so as to produce the selected reference voltage vectors.

15 Claims, 7 Drawing Sheets

SWITCHING MODE I

$$\bar{e}(n) = T_{01}\bar{v} + \alpha_1\bar{v}_i + \beta_1\bar{v}_j + T_{02}\bar{v}_0 + \alpha_1\bar{v}_i + \beta_1\bar{v}_j$$

SWITCHING MODE II

$$\bar{e}(n) = \alpha\bar{v}_i + \beta\bar{v}_j + T_0\bar{v}_0$$

SWITCHING MODE III

$$\bar{e}(n) = \alpha\bar{v}_i$$

PWM INVERTER APPARATUS FOR CONTROLLING ROTATING MAGNETIC FLUX IN A.C. MOTORS

BACKGROUND OF THE INVENTION

This invention relates to a PWM inverter apparatus, and more particularly to a gate signal generating method and device suitable for controlling a rotating magnetic flux in an a.c. motor driven by a PWM inverter.

A manner of control is called PWM control when a three-phase inverter driving an a.c. motor is controlled by a pulse-width modulated (PWM) gate signal. In the case of the so-called PWM control, it is known that such a PWM gate signal is generated on the basis of a detected rotating magnetic flux in the a.c. motor which is the load of the three-phase inverter or on the basis of an externally-applied rotating magnetic flux command.

JP-A-No. 59-25592 describes a method of controlling an output voltage vector of an inverter driving a load such as an induction motor by detecting a rotating magnetic flux in the induction motor, comparing this detected rotating magnetic flux with a predetermined reference rotating magnetic flux and, when the former deviates from the latter, correcting the error to zero.

JP-A-Nos. 61-227696 and 62-16092 describe a method of controlling an output voltage vector of an inverter by setting a vector of a virtual rotating magnetic flux related to that of a reference rotating magnetic flux, comparing these vectors and, when the former deviates from the latter, correcting the error to zero.

The control of the inverter output voltage vector is also described in JP-A-58-39278 corresponding to U.S. Pat. No. 4,488,215 in addition to JP-A-61-22769 and JP-A-62-16092 cited above. According to the disclosures of these publications, six voltage unit vectors v and two zero vectors $v_0$ determined by combination of on-off states of the inverter's switching elements of three-phase bridge arrangement are suitably combined to control the output voltage vector of the inverter.

However, in the case of the prior art method and apparatus for controlling the inverter output voltage vector on the basis of the deviation of the detected rotating magnetic flux from the reference rotating magnetic flux, a magnetic flux detector for detecting the rotating magnetic flux is necessarily required, resulting in a complicated structure of the apparatus.

Also, in the case of the prior art method and apparatus for controlling the inverter output voltage vector on the basis of the deviation of the detected rotating magnetic flux from the reference rotating magnetic flux, as well as the prior art method and apparatus for controlling the inverter output voltage vector on the basis of the deviation of the virtual rotating magnetic flux vector from the reference rotating magnetic flux vector, the sequence of processing from the step of data sampling for detecting the deviation to the step of controlling the voltage vector must be carried out at the same time, that is, the sequence of processing must be substantially instantaneously executed so as to prevent degradation of the accuracy of control. Therefore, high-speed processing means is necessarily required in order to follow up the rotating magnetic flux command to attain the desired control with high accuracy. In other words, there arises the problem that the accuracy of control is inevitably restricted by the speed of processing. Another problem is that the PWM switching frequency is limited by the processing period described above and cannot be increased.

Further, because the voltage vectors are selected so as to confine all the instantaneous errors within an allowable range, and the switching elements of the inverter are turned on-off on the basis of the selected voltage vectors, the order of turning on-off the switching elements of the individual phases, that is, the switching mode is irregularly changed. Therefore, there arises the problem that the switching frequency of the inverter's switching elements per unit time cannot be predicted for the control purpose. This problem exerts a great influence on the selection of the switching tolerance determined in relation to the heat tolerance of the switching elements of the inverter.

SUMMARY OF THE INVENTION

It is an object of the present invention to provide a PWM inverter apparatus and a gate signal generating method and device, in which a PWM inverter gate signal can be generated while following up a rotating magnetic flux command with high accuracy and without being restricted by the prior art requirement for provision of high-speed processing means for generating the PWM gate signal.

Another object of the present invention is to provide a gate signal generating method and device for a PWM inverter apparatus, in which the switching frequency can be predicted to attain the desired control.

Still another object of the present invention is to provide a PWM inverter apparatus and a gate signal generating method and device for the PWM inverter apparatus, in which the frequency of the gate signal is increased so as to minimize appearance of ripples in the inverter output voltage and to decrease noise generated in a load of the PWM inverter.

In accordance with one aspect of the present invention which attains the above objects, there is provided a PWM inverter apparatus used for driving an a.c. motor, comprising: inverter means including an output part connected to the a.c. motor and switching elements on-off controlled by a PWM signal; means for receiving, at an interval of a given sampling period, status command information specifying a desired status of a vector of a rotating magnetic flux in the a.c. motor; means for predicting, on the basis of at least the status command information received and sampled at each sampling time, the status of the vector of the rotating magnetic flux which will be produced in the a.c. motor at next sampling time; means for calculating the difference between the status of the vector of the rotating magnetic flux specified, by the status command information sampled at the present or current sampling time and the predicted status of the vector of the rotating magnetic flux which will be produced at next sampling time; means for synthesizing the difference vector using ones selected from among a plurality of predetermined reference voltage vectors; and means for generating a PWM signal for controlling the switching elements of the inverter means so as to produce the selected reference voltage vectors.

There are two methods for predicting the magnetic flux vector which will be obtained by sampling at the next sampling time. The sampling period is very short. Therefore, in the first predicting method, the difference between the magnetic flux vector which will be obtained by sampling at the next sampling time and the magnetic flux vector obtained by sampling at the current sampling time is regarded to be substantially equal to the difference between the magnetic flux vector obtained by sampling at the preceding sampling time and the magnetic flux vector obtained by sampling at the current sampling time. On the other hand, in the second predicting method, the magnitude of the magnetic flux vector which will be obtained by sampling at the next sampling time is regarded to be substantially equal to the magnitude of the magnetic flux vector obtained by sampling at the present sampling time, and the magnetic flux vector which will be obtained by sampling at the next sampling time is regarded to be equal to the magnetic flux vector obtained by rotating the magnetic flux vector, obtained by sampling at the present sampling time, by an angle corresponding to the rotation angle of the magnetic flux vector. In the case of the latter predicting method, the means used in the former predicting method for calculating the difference between the magnetic flux vector obtained by sampling at the preceding sampling time and the magnetic flux vector obtained by sampling at the present sampling time can be directly used for calculating the difference between the magnetic flux vector predicted to be obtained by sampling at the next sampling time and the magnetic flux vector obtained by sampling at the present sampling time, by merely changing the input data. Thus, the former predicting method will be principally described hereinafter.

The plural reference voltage vectors described above include six voltage unit vectors v and two zero vectors $v_0$. The six voltage unit vectors are such that their directions determined by the combinations of the on-off states of the inverter's switching elements of three-phase bridge arrangement are shifted by an angle of 60° relative to each other, and the magnitude of each of these six vectors is a unit voltage. The magnitude of each of the two zero vectors is zero.

In an embodiment of the present invention, the difference vector $\bar{e}$ between a magnetic flux vector obtained by sampling the preceding sampling time and that obtained by sampling at the present sampling time is calculated each time the sampling is effected, and two voltage unit vectors $\bar{v}_i$ and $\bar{v}_j$ nearest in direction to the difference vector e are selected to synthesize the difference vector e according to the following equation:

$$\bar{e} = \alpha \bar{v}_i + \beta \bar{v}_j$$

where $\alpha$ and $\beta$ are hold times of the voltage unit vectors $\bar{v}_i$ and $\bar{v}_j$ respectively.

On the basis of the two voltage unit vectors and their hold times described above, the switching mode of the switching elements of the inverter is determined.

The result of synthesis of the difference vector and the magnetic flux vector obtained at the present sampling time provides the predicted magnetic flux vector which will be obtained at the next sampling time, and this latter magnetic flux vector is delayed from the magnetic flux vector obtained at the present sampling time, by a period of time $T_S$ given by the following equation:

$$T_S = \alpha + \beta$$

Therefore, in order that the synthesized vector coincides with a magnetic flux vector corresponding to a magnetic flux command which will be sampled at the next sampling time, the next sampling must be effected at time later by $T_S$ from the present sampling time. Thus, it may be necessary to change the sampling period at each sampling time.

In a second embodiment of the present invention, the sampling period $T_S$ is maintained at a predetermined value. First, as in the case of the first embodiment, two voltage unit vectors $\bar{v}_i$, $\bar{v}_j$ and their hold times $\alpha$, $\beta$ are selected so as to synthesize the difference vector between a magnetic flux vector obtained at preceding sampling time and a magnetic flux vector obtained at the present sampling time. When the relation $T_S = \alpha + \beta$ does not hold, a value $T_0$ which satisfies the relation $$T_S = \alpha + \beta + T_0$$

is calculated. Then, the difference vector $\bar{e}$ is synthesized by multiplying the two voltage unit vectors $\bar{v}_i$, $\bar{v}_j$ and zero vector $\bar{v}_0$ by their hold times $\alpha$, $\beta$ and $T_0$ respectively and adding the results of multiplication. Therefore, the difference vector $\bar{e}$ is given by the following equation:

$$\bar{e} = \alpha \bar{v}_i + \beta \bar{v}_j + T_0 \bar{v}_0$$

Further, the hold times $\alpha$, $\beta$ and $T_o$ may be divided into m sections (m: a natural number) $\alpha_m$, $\beta_m$ and $T_{om}$ (m = 1, 2, 3, ---, m), so that the values of $\alpha_m$, $\beta_m$ and $T_{om}$ satisfy the following equations:

$$\bar{e} = \sum_{m=1}^{m} (\alpha_m \bar{v}_i + \beta_m \bar{v}_j + T_{om} \bar{v}_0)$$

$$T_S = \sum_{m=1}^{m} (\alpha_m + \beta_m + T_{om})$$

Further, it is desirable that the zero vector $\bar{v}_0$ is located at the start point or end point of one of the two voltage unit vectors $\bar{v}_i$ and $\bar{v}_j$, so that the state of the switching element belonging to one phase only changes when the zero vector $\bar{v}_0$ shifts to $\bar{v}_i$ or $\bar{v}_j$.

The PWM inverter apparatus of the present invention is based on the principle which will be described now. That is, a given magnetic flux command $\phi_R$ (a scalar value) and a given velocity command $\omega_R$ (a scalar value) are sampled at an interval of a sampling period $T_S$, and the rotation angle of a magnetic flux vector obtained at each sampling time is calculated on the basis of the velocity command value and the sampling period $T_S$. Also, the difference vector $\bar{e}$ between a magnetic flux vector $\phi(n-1)$ obtained at $(n-1)$-th sampling time and a magnetic flux vector $\phi(n)$ obtained at n-th sampling time is calculated, and the result of adition of the difference vector e to the magnetic flux vector $\phi(n)$ obtained at the n-th sampling time is predicted to be a magnetic flux vector $\phi(n+1)$ which will be obtained at $(n+1)$-th sampling time. This difference vector $\bar{e}$ is synthesized by the use of at least two reference voltage vectors selected from among a plurality of reference voltage vectors on the basis of the calculated rotation angle described above. Thus, when the PWM inverter apparatus is driven to produce the selected reference voltage vectors, the magnetic flux vector obtained at the $(n+1)$-th sampling time coincides with the predicted magnetic flux vector $\phi(n+1)$, so that the rotating magnetic flux in a load connected to the PWM inverter can follow up the magnetic flux command. The principle of the PWM inverter apparatus according to the present invention will be understood from the above description.

It will be seen that the difference vector $\bar{e}(n)$ obtained at the n-th sampling time corresponds to a change of the commanded magnetic flux vector from the $(n-1)$-th sampling time to the n-th sampling time. This difference vector $\bar{e}(n)$ is equal to the product of the inverter output voltage vector $\bar{v}(n)$ and the sampling period $T_S$. Therefore, when the PWM inverter is driven for the period of time $T_S$ by the voltage vector $\bar{v}(n)$ corresponding to the difference vector $\bar{e}(n)$, the rotating magnetic flux in the load is subjected to the change corresponding to the difference vector $\bar{e}(n)$, thereby producing the rotating magnetic flux vector meeting the command.

In the case of the PWM inverter formed of the switching elements of three-phase bridge arrangement, the inverter output voltage vector is determined by the combinations of the on-off states of the switching elements disposed on the positive and negative arms of the bridge. Thus, there are eight combinations. That is, there are six voltage unit vectors $\bar{v}(\bar{v}_1, \bar{v}_2, \bar{v}_3, \bar{v}_4, \bar{v}_5, \bar{v}_6)$ shifted by an angle of $\pi/3$ one another and two zero vectors $\bar{v}_0$ ($\bar{v}_7, \bar{v}_8$). The zero vectors designate those voltage unit vectors where the line output voltage of the inverter is zero.

Therefore, in order to obtain a desired output voltage vector corresponding to a difference vector, suitable ones of the voltage unit vectors must be combined to synthesize the difference vector. For this purpose, two voltage vectors having respectively the same directions as those of two adjacent voltage unit vectors $\bar{v}_i$ and $\bar{v}_j$ nearest in direction (angle) to the difference vector $\bar{e}(n)$ are used to produce a voltage vector which coincides with the difference vector $\bar{e}(n)$. The magnitudes of these voltage vectors having the same directions as those of $\bar{v}_i$ and $\bar{v}_j$ are determined by suitably selecting the holding times $\alpha$ and $\beta$ during which the associated switching elements are held to produce output voltages of the respective voltage vectors. When the sum $(\alpha+\beta)$ of the hold times is not equal to the sampling period $T_S$, the sampling period $T_S$ is suitably adjusted or the hold time $T_o$ of the zero vector $\bar{v}_0$ is added to the sum $(\alpha+\beta)$ so that the relation $T_S = \alpha + \beta + T_o$ can be obtained.

The voltage unit vectors $\bar{v}_i$, $\bar{v}_j$ and $\bar{v}_0$ constituting the desired output voltage vector are represented by the combinations of the on-off states of the switching elements of the inverter as described already. Thus, a "1" and a "0" are used to represent the on and off states respectively of the switching elements so as to provide the pattern of the gate signal applied to the switching elements of the inverter.

Therefore, when the vector components of the voltage unit vectors $\bar{v}_i$, $\bar{v}_j$, $\bar{v}_0$ and their hold times $\alpha$, $\beta$, $T_o$ are combined to form the gate signal so as to selectively turn on-off the switching elements of the inverter according to the gate signal pattern, the output voltage vector of the PWM inverter can be controlled in a relation in which the rotating magnetic flux changes while following up the magnetic flux command.

The logical and arithmetic processing between the step of reading the commands and the step of producing the gate signal can be completed within the sampling period $T_S$. Therefore, the sampling period $T_S$ can be set to match the processing speed of the logical and arithmetic processing means, and any especial high-speed processing means is unnecessary.

Further, the PWM switching frequency can be predicted for the purpose of control, because the sampling period $T_S$ is known, and the number of times of changing over the voltage unit vectors within the sampling period $T_S$ is known and fixed.

On the other hand, when the hold times $\alpha$, $\beta$ and $T_o$ are divided into m sections to calculate the synthesized difference vector, the PWM switching frequency can be increased even when the sampling period $T_S$ may be maintained constant. Therefore, appearance of ripples in the output voltage of the PWM inverter can be minimized when a high PWM switching frequency is employed. Also, the noise level of the a.c. motor connected as the load can be made higher than the audible frequency range, so that the audible noise can be decreased.

DESCRIPTION OF THE PREFERRED EMBODIMENTS

Preferred embodiments of the present invention will now be described in detail with reference to the drawings.

Figure 1:
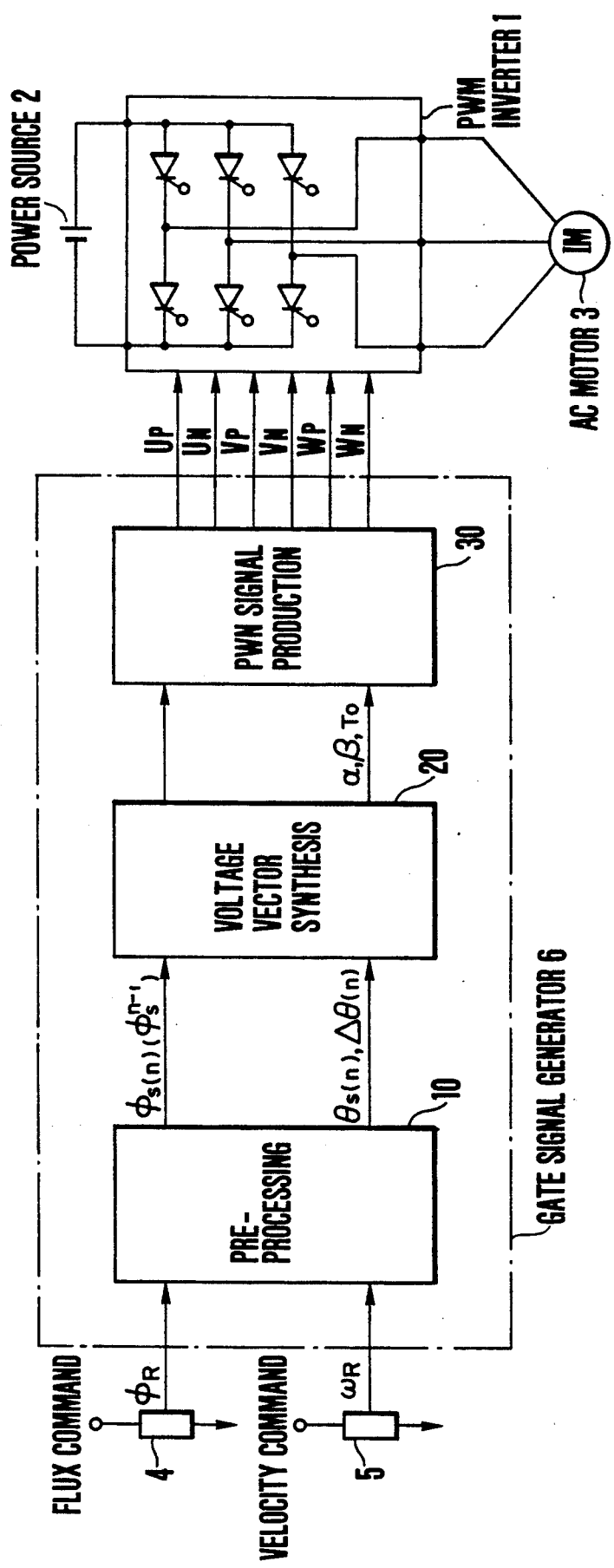
FIG. 1 is a block diagram showing the general structure of a PWM inverter apparatus provided with an embodiment of the gate signal generating device according to the present invention.

FIG. 1 shows the general structure of a PWM inverter apparatus provided with an embodiment of the gate signal generating device according to the present invention.

Referring to FIG. 1, a PWM inverter 1 inverts d.c. power supplied from a d.c. power source 2 into a.c. power so as to generate a rotating magnetic flux for driving a three-phase a.c. motor 3 which is illustrated herein as an induction motor. A rotating magnetic flux command for determining the phase of rotation of the a.c. motor 3 is supplied from speed control means or torque control means (not shown). That is, a magnetic flux command $\phi_R$ and a velocity command $\omega_R$ commanding the magnitude and velocity respectively of a rotating magnetic flux vector are supplied through respective potentiometers 4 and 5 to the gate signal generating device generally designated by numeral 6.

The gate signal generating device 6 receives the magnetic flux command $\phi_R$ and the velocity command $\omega_R$ at an interval of a predetermined sampling period $T_S$. On the basis of these commands, a difference vector between a magnetic flux vector obtained by sampling at preceding sampling time generally called (n−1)-th sampling time and a magnetic flux vector obtained by sampling at the present sampling time generally called n-th sampling time is calculated in the gate signal generating device 6. Then, this difference vector is synthesized from at least two selected from among a plurality of reference voltage vectors, and gate signals components $U_P$, $V_P$, $W_P$, $U_N$, $V_N$ and $W_N$ providing such a synthesized vector are produced and applied to the gates of respective switching elements $S_{UP}$, $S_{VP}$, $S_{WP}$, $S_{UN}$, $S_{VN}$ and $S_{WN}$ of the PWM inverter 1. Herein, the suffixes U, V and W represent the three phases respectively, and the suffixes P and N represent the positive and negative arms of the bridge respectively. The gate signal generating device 6 includes pre-processing means 10, voltage vector synthesizing means 20 and gate signal producing means 30 and can be formed by a one-chip microcomputer.

Figure 2:
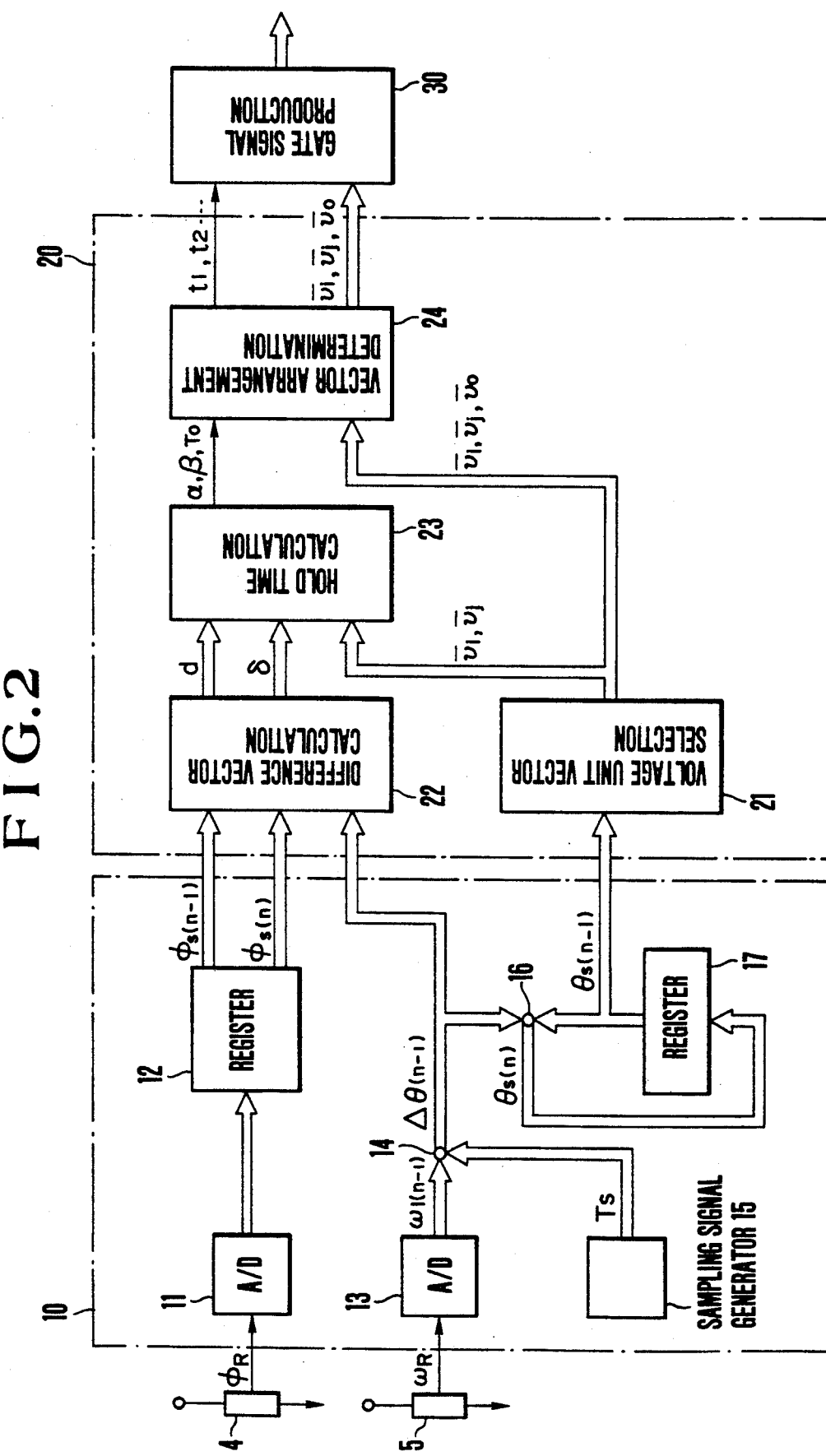
FIG. 2 is a block diagram showing the detailed structure of the embodiment of the gate signal generating device shown in FIG. 1.

The detailed structure and operation of the pre-processing means 10, voltage vector synthesizing means 20 and gate signal producing means 30 constituting the gate signal generating device 6 will now be described in detail with reference to FIG. 2.

Pre-processing means 10

The magnetic flux command $\phi_R$ is supplied at the interval of the predetermined sampling period $T_S$ to an A/D converter 11 to be converted from an analog quantity into a digital magnetic flux command $\phi_S$. The output of the A/D converter 11 is successively supplied to a register 12 acting as magnetic flux command storing means. The register 12 temporarily stores both the magnetic flux command $\phi_S(n-1)$ sampled at preceding (n−1)-th sampling time and the magnetic flux command $\phi_S(n)$ sampled at the present n-th sampling time.

On the other hand, the velocity command $\omega_R$ is supplied at the interval of the predetermined sampling period $T_S$ to an A/D converter 13 to be converted from an analog quantity into a digital velocity command $\omega_1$. This velocity command $\omega_1$ is supplied to a multiplier 14 acting as angle-of-lead calculating means. In the multiplier 14, the velocity command $\omega_1$ is multiplied by the period $T_S$ supplied from sampling signal generating means 15, and an amount of lead $\Delta\theta(n)$ of the rotation angle of the magnetic flux vector from each sampling time to the next sampling time is generally calculated as expressed by the following equation (1):

$$\Delta\theta(n) = \omega_1(n) \cdot T_S \tag{1}$$

Therefore, the rotation angle $\theta_S(n)$ of the magnetic flux vector obtained at the present sampling time relative to the rotation angle $\theta_S(n-1)$ of the magnetic flux vector obtained at preceding sampling time is given by the following equation (2):

$$\theta_S(n) = \theta_S(n-1) + \Delta\theta(n-1) \tag{2}$$

The equation (2) is calculated by the combination of an adder 16 and a register 17. That is, the desired rotation angle $\theta_S(n-1)$ of the magnetic flux vector obtained at the preceding (n−1)-th sampling time is stored in the register 17, and the angle-of-lead $\Delta\theta(n)$ obtained at the present n-th sampling time is added to the rotation angle $\theta_S(n-1)$ in the adder 16. As soon as the calculation according to the equation (2) is executed, the result of addition is supplied to the register 17 to update the content of the register 17.

Voltage vector synthesizing means 20

First, the basic idea of synthesizing a voltage vector will be described. The relation between an output voltage vector $\tilde{v}(t)$ of the PWM inverter 1 and a magnetic flux vector $\tilde{\phi}(t)$ induced in the a.c. motor 3 is expressed by the following equation (3):

$$V(t) = d\tilde{\phi}(t)/dt \tag{3}$$

Considering processing by software, the continuous equation (3) is now transformed into the following discrete equation (4):

$$V(n) = \{\tilde{\phi}(n) - \tilde{\phi}(n-1)\}/T_S \tag{4}$$

Further transformation of the equation (4) provides the following equation (5):

$$\tilde{\phi}(n) + \tilde{\phi}(n-1) = T_s \cdot V(n) \tag{5}$$

It is supposed that, in the equation (5), the sampling period $T_S$ is very short, and the magnitude of $\tilde{\phi}(n)$ does not change in that period. Thus, when $\phi_S(n)$ represents the magnitude of $\tilde{\phi}(n)$, and $\theta_S(n)$ represents the direction, that is, the rotation angle of $\tilde{\phi}(n)$, the following equation (6) is obtained:

$$\tilde{\phi}(n) = \phi_S(n) e^{j\theta_S(n)} \tag{6}$$

Figure 3:
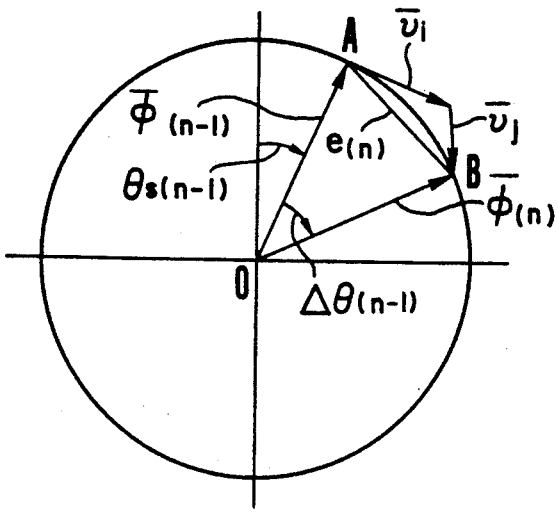
FIG. 3 illustrates how a vector of a magnetic flux command changes.

The motion of the magnetic flux vector given by the equation (6) is schematically illustrated in FIG. 3. Suppose now that a change as shown in FIG. 3 occurs between the vector $\tilde{\phi}(n-1)$ of the magnetic flux command sampled at the (n−1)-th sampling time and the vector $\tilde{\phi}(n)$ of the magnetic flux command sampled at the n-th sampling time. In this case, the difference $\{\tilde{\phi}(n) - \tilde{\phi}(n-1)\}$ between those two vectors is equal to a difference vector $\tilde{e}(n)$ directed from the point A to the point B in FIG. 3.

Suppose further that the difference between a predicted magnetic flux vector $\tilde{\phi}(n+1)$ which will be obtained at the next (n+1)-th sampling time and the magnetic flux vector $\tilde{\phi}(n)$ is equal to the difference between the magnetic flux vectors $\tilde{\phi}(n-1)$ and $\tilde{\phi}(n)$. Then, it will be apparent from the equation (5) that, when a voltage vector $\tilde{v}(n)$ corresponding to the difference vector $\tilde{e}(n)$ is produced, the magnetic flux vector $\tilde{\phi}(n)$ can be changed to the predicted magnetic flux vector $\tilde{\phi}(n+1)$ which will be obtained at the next (n+1)-th sampling time.

Figure 4:
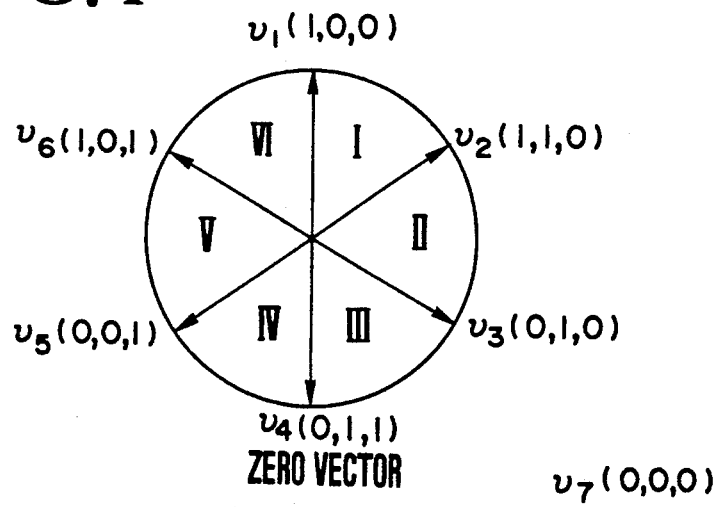
FIG. 4 illustrates an arrangement of voltage unit vectors.

It is known that the direction of the output voltage vector of the PWM inverter 1 is determined by the combinations of the on-off states of the switching elements of three-phase bridge arrangement constituting the inverter 1. In terms of unit vectors, the output voltage vector of the PWM inverter 1 can be expressed by six discrete voltage unit vectors $\tilde{v}_1$ to $\tilde{v}_6$ shifted in direction by a pitch of $\pi/3$ one another and two zero vectors $\tilde{v}_0$ ($\tilde{v}_7$ and $\tilde{v}_8$), as shown in FIG. 4. When a "1" and a "0" are used to represent the on and off states respectively of each of the switching elements $S_{UP}$, $S_{VP}$ and $S_{WP}$ on the positive arm of the bridge, each of the voltage unit vectors and zero vectors can be expressed by the combination of the "1" and "0". For example, the voltage unit vector $v_1$ can be expressed as (1, 0, 0). It is apparent that, in the case of the switching elements $S_{UN}$, $S_{VN}$ and $S_{WN}$ on the negative arm of the bridge, the binary expression is contrary to that described above.

Therefore, in order to produce a voltage vector $\tilde{v}(n)$ corresponding to the difference vector $\tilde{e}(n)$, this voltage vector $\tilde{v}(n)$ must be synthesized by the combination of suitable ones of the plural voltage unit vectors $v_1$ to $v_6$ and zero vector $\tilde{v}_7$, $\tilde{v}_8$.

According to a most preferable method, two adjacent voltage unit vectors $\tilde{v}_i$ and $\tilde{v}_j$ nearest in direction to the difference vector $\tilde{e}(n)$ are selected, and the hold times $\alpha$ and $\beta$ of the respective voltage unit vectors $\tilde{v}_i$ and $\tilde{v}_j$ are suitably adjusted until the following equation (7) is satisfied, so that the voltage vector $\tilde{v}(n)$ corresponding to the difference vector $\tilde{e}(n)$ can be produced:

$$\tilde{e}(n) = \alpha \tilde{v}_i + \beta \tilde{v}_j \tag{7}$$

This means that, after the voltage vector $\tilde{v}_i$ is produced for a period of $\alpha$ from the point A in FIG. 3, and the voltage unit vector $\tilde{v}_j$ is then produced for a period of $\beta$, the leading end of the magnetic flux vector reaches the target point B in FIG. 3.

However, the equation (5) shows that the voltage vector $\tilde{v}(n)$ has the magnitude of $T_S$ which is a scalar quantity. Therefore, when the period of time $(\alpha + \beta)$ required until the difference vector $\tilde{e}(n)$ given by the equation (7) moves from the point A to the point B in FIG. 3 coincides with the sampling period $T_S$, the voltage vector $\tilde{v}(n)$ is expressed by the right-hand members of the equation (7). That is, the equation (7) is based on the condition that the following equation (8) is satisfied:

$$T_S = \alpha + \beta \tag{8}$$

The value of $(\alpha + \beta)$ changes depending on the angle-of-lead $\Delta\theta(n)$ and rotation angle $\theta_S(n)$ of the magnetic flux vector. Therefore, in the case of synthesizing the difference vector $e(n)$ on the basis of the equations (7) and (8), the value of the sampling period $T_S$ is changed in relation to the change in the value of $(\alpha + \beta)$. However, a complex control is required for changing the sampling period $T_S$. In order to avoid such a complexity of control, the zero vector $v_0$ having no magnitude and no direction is preferably employed, and the difference vector $e(n)$ is synthesized so that the following equations (9) and (10) are satisfied:

$$\tilde{e}(n) = \alpha \tilde{v}_i + \beta \tilde{v}_j + T_o \tilde{v}_o \tag{9}$$

$$T_o = T_S - (\alpha + \beta) \tag{10}$$

That is, when the hold time $T_o$ to the zero vector $\tilde{v}_0$ is selected to satisfy the equation (10), the sampling period $T_S$ can be maintained constant regardless of whatever change in the value of $(\alpha + \beta)$.

The difference vector $\tilde{e}(n)$ can be similarly synthesized when, in the equation (9), the hold times $\alpha$, $\beta$ and $T_o$ may be suitably divided into two values $\alpha_1$, $\alpha_2$; $\beta_1$, $\beta_2$; and $T_{o1}$, $T_{o2}$ which satisfy the relations $\alpha_1 + \alpha_2 = \alpha$, $\beta_1 + \beta_2 = \beta$ and $T_{o1} + T_{o2} = T_o$ respectively, and the right-hand members may be changed over in the order of $\alpha_1\tilde{v}_i \to T_{o1}\tilde{v}_o \to \beta_1\tilde{v}_j \to \alpha_2\tilde{v}_i \to T_{o2}\tilde{v}_o \to \beta_2\tilde{v}_j$. Synthesis may be similarly achieved by dividing each of the hold times $\alpha$, $\beta$ and $T_o$ into m values (m: a natural number). Division of the hold times in the manner described above is advantageous in that the inverter output frequency can be increased so that appearance of ripples in the invention output voltage can be minimized, and audible noise generated from the a.c. motor 3 can be greatly suppressed.

As described above, the difference vector $\tilde{e}(n)$ coincides with the voltage vector $T_S \cdot \tilde{v}_{(n)}$, and the hold times $\alpha$, $\beta$ and $T_o$ have a dimension of time, while the voltage unit vectors, $\tilde{v}_i$, $\tilde{v}_j$ $\tilde{v}_0$ have a unit of voltage.

The detailed structure of the voltage vector synthesizing means 20 shown in FIG. 2 will now be described.

Voltage unit vector selecting means 21

As described already, two adjacent voltage unit vectors $\tilde{v}_i$ and $\tilde{v}_j$ nearest in direction to the difference vector $\tilde{e}(n)$ are selected for the synthesis of $\tilde{e}(n)$. However, it takes a long period of time for the logical and arithmetic processing when the directions of all of the six voltage unit vectors are compared with that of the difference vector $e(n)$. Usually, the magnitude of the magnetic flux vector $\phi(n)$ does not make any appreciable change, and its leading end moves along the circumference of a circle. Thus, the direction of the difference vector $\tilde{e}(n)$ is oriented along the circle. Therefore, the direction of the difference vector $\tilde{e}(n)$ is generally determined by the rotation angle $\theta_S(n)$ of the vector $\phi(n)$ of the magnetic flux command $\phi_S$ sampled at the n-th sampling time or by the rotation angle $\theta_S(n-1)$ of the vector $\phi(n-1)$ of the magnetic flux command $\phi_s$ sampled at the $(n-1)$-th sampling time. Therefore, the voltage unit vector selecting means 21 shown in FIG. 2 includes a ROM storing the following Table 1. More precisely, six angular ranges I to VI partitioned by the six voltage unit vectors $\tilde{v}_1$ to $\tilde{v}_6$ are set as shown in FIG. 4, and the combinations of voltage unit vectors $\tilde{v}_i$ and $\tilde{v}_j$ to be selected are listed in Table 1 to define the individual angular ranges I to VI respectively.

TABLE 1

| $\theta_S(n-1)$ | Voltage unit vectors to be selected $(v_i, v_j)$ |
|---|---|
| I | $(\tilde{v}_3, \tilde{v}_4)$ |
| II | $(\tilde{v}_4, \tilde{v}_5)$ |
| III | $(\tilde{v}_5, \tilde{v}_6)$ |
| IV | $(\tilde{v}_6, \tilde{v}_7)$ |
| V | $(\tilde{v}_1, \tilde{v}_2)$ |
| VI | $(\tilde{v}_2, \tilde{v}_3)$ |

Thus, when the rotation angle $\theta_S(n-1)$ of the vector $\phi_n(n-1)$ of the magnetic flux command $\phi_S(n-1)$ sampled at the $(n-1)$-th sampling time is supplied from the register 17 of the pre-processing myans 10, the voltage unit vector selecting means 21 selects and generates the corresponding combination of the voltage unit vectors $\tilde{v}_i$ and $\tilde{v}_j$ as its output. The voltage unit vector selecting means 21 further includes means for storing vector component data of the voltage unit vectors including the zero vectors $v_0$, and the selected vector component data of the voltage unit vectors $\tilde{v}_i$, $\tilde{v}_j$ and zero vectors $\tilde{v}_7$, $\tilde{v}_8$ are supplied from the voltage unit vector selecting means 21 to vector arrangement determining means 24.

Difference vector calculating means 22

This difference vector calculating means 22 receives the magnetic flux commands $\phi_S(n-1)$ and $\phi_S(n)$ from the magnetic flux command storing means 12 in the pre-processing means 10 and receives also the detected angle-of-lead $\Delta\theta(n)$ from the multiplier 14 in the pre-processing means 10, so as to calculate the vector components, that is, the magnitude and direction of the difference vector ē(n). This calculation will be described with reference to FIG. 5.

Figure 5:
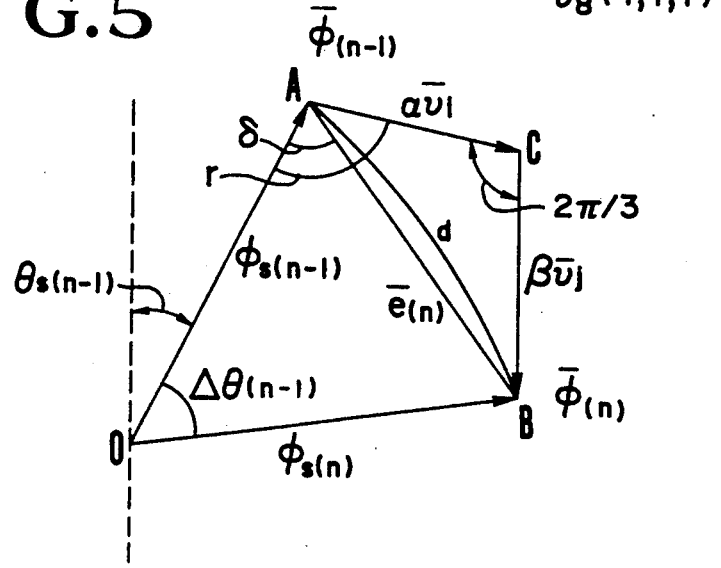
FIG. 5 illustrates how to calculate a difference vector and hold times.

Suppose that the magnetic flux commands $\phi_S(n-1)$ and $\phi_S(n)$ have the relation shown in FIG. 5. In such a case, the magnitude d of the difference vector ē(n) and the angle δ between the difference vector e(n) and the vector $\phi(n-1)$ of the magnetic flux command $\phi_S(n-1)$ can be geometrically calculated according to the following equations (11) and (12) respectively:

$$d = \{\phi_S(n-1)^2 + \phi_S(n)^2 - 2\phi_S(n-1)\cdot\phi_S(n) \cos \Delta\theta(n)\}^{\frac{1}{2}} \quad (11)$$

$$\delta = \cos^{-1}\{(\phi_S(n-1) - \phi_S(n)\cdot\cos \Delta\theta(n))/d\} \quad (12)$$

When the sampling period $T_S$ is short, the command $\phi_S(n)$ can be approximated to be substantially equal to the command $\phi_S(n-1)$, and the angle-of-load $\Delta\theta(n)$ is also small. Therefore, the equations (11) and (12) can be transformed into the following equations (11') and (12') respectively:

$$d = \Delta\theta(n)\cdot\phi_S(n) \quad (11')$$

$$\delta = \frac{1}{2}\{\pi - \Delta\theta(n)\} \quad (12')$$

Hold time calculating means 23

The hold times α and β of the selected voltage unit vectors $\bar{v}_i$ and $\bar{v}_j$ respectively are calculated by hold time calculating means 23 according to the geometric diagram shown in FIG. 5.

Figure 7:
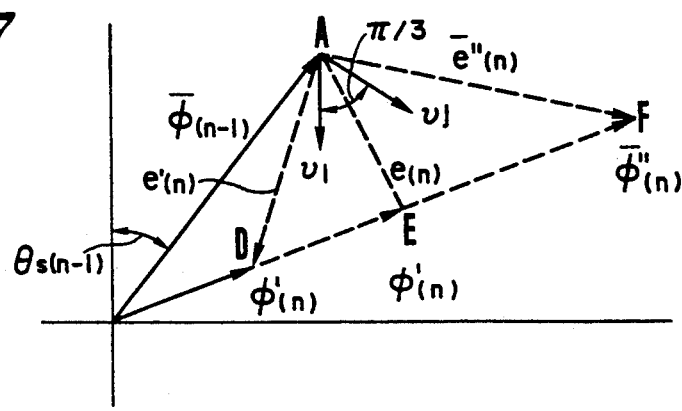
FIG. 7 illustrates difference vectors lying outside an angular range defined between two selected voltage unit vectors.

In the case of the calculation of the individual hold times α and β, whether or not the difference vector ē(n) lies within the angular range defined between the voltage unit vectors $\bar{v}_i$ and $\bar{v}_j$ selected from Table 1 must be checked. This is because, when the magnitude of the commanded magnetic flux vector $\phi(n)$ changes greatly relative to the commanded magnetic flux vector $\phi(n-1)$ until $\phi(n)$ changes to $\phi'(n)$ or $\phi''(n)$ as shown in FIG. 7, its leading end will be located outside the angular range defined between the selected voltage unit vectors $\bar{v}_i$ and $\bar{v}_j$, although this is an exceptional example. In such a case, these two voltage unit vectors $\bar{v}_i$ and $\bar{v}_j$ cannot be used to synthesize the difference vector ē(n).

Therefore, the hold time calculating means 23 decides, on the basis of the angle data δ of the difference vector ē(n), as to whether or not the vector ē(n) lies within the angular range defined between the vectors $\bar{v}_i$ and $\bar{v}_j$. When the result of decision is "Yes", the hold times α and β are calculated according to the diagram shown in FIG. 5. On the other hand, when the result of decision is "No", one of the voltage unit vectors $\bar{v}_i$ and $\bar{v}_j$ nearer in direction to the difference vector e(n) is selected, and the hold time α or β corresponding to the selected vector $\bar{v}_i$ or $\bar{v}_j$ is calculated to be used for the synthesis of the difference vector ē(n). The procedure for the latter mode of voltage vector synthesis will be described later in connection with the vector arrangement determining means 24 for conveniences of description. Herein, the former case, that is, the general case where the difference vector ē(n) lies within the angular range defined between the voltage unit vectors $\bar{v}_i$ and $\bar{v}_j$ will now be described.

Let $\alpha = \overline{AC}$ and $\beta = \overline{CB}$ in FIG. 5. Then, the hold times α and β can be calculated according to the following equations (13) and (14) respectively:

$$\alpha = \frac{2}{\sqrt{3}} kt \cdot d \cdot \sin(\pi/3 - \gamma + \delta) \quad (13)$$

$$\beta = \frac{2}{\sqrt{3}} kt \cdot d \cdot \sin(\gamma - \delta) \quad (14)$$

where kt is a coefficient used for conversion into time, and γ is an angle determined by both the selected one of the voltage unit vectors and the rotation angle $\theta_S(n-1)$. Table 2 shows the relation between the voltage unit vectors $\bar{v}_1$ to $\bar{v}_6$ and the corresponding values of the angle γ.

TABLE 2

| Selected voltage unit vector | γ |
|---|---|
| $\bar{v}_1(1, 0, 0)$ | $\theta_S(n-1) - \pi$ |
| $\bar{v}_2(1, 1, 0)$ | $\theta_S(n-1) + 2\pi/3$ $(0° \leq \theta_S(n-1) < \pi/6)$ |
| | $\theta_S(n-1) - 4\pi/3$ $(3\pi/2 \leq \theta_S(n-1) < 2\pi)$ |
| $\bar{v}_3(0, 1, 0)$ | $\theta_S(n-1) + \pi/3$ $(0° \leq \theta_S(n-1) < \pi/2)$ |
| | $\theta_S(n-1) - 5\pi/3$ $(11\pi/6 \leq \theta_S(n-1) < 2\pi)$ |
| $\bar{v}_4(0, 1, 1)$ | $\theta_S(n-1)$ |
| $\bar{v}_5(0, 0, 1)$ | $\theta_S(n-1) - \pi/3$ |
| $\bar{v}_6(1, 0, 1)$ | $\theta_S(n-1) - 2\pi/3$ |

When the sampling period $T_S$ is maintained constant, the values of α and β calculated according to the respective equations (13) and (14) are substituted into the equation (10) to calculate the hold time $T_0$ of the zero vector $\bar{v}_0$.

Vector arrangement determining means 24

By the use of the hold times α, β, $T_0$ and the voltage unit vectors $\bar{v}_i$, $\bar{v}_j$, $\bar{v}_0$ selected in the manner described above, the voltage vector $\bar{v}(n)$ corresponding to the difference vector ē(n) can be synthesized. Therefore, when the switching elements of the PWM inverter 1 are driven according to this synthesized voltage vector $\bar{v}(n)$, the rotating magnetic flux can be controlled to follow up the change in the vector of the magnetic flux command from $\phi(n-1)$ to $\phi(n)$.

In the course of the synthesis of the voltage vector $\bar{v}(n)$, the vector arrangement determining means 24 determines the arrangement of the individual voltage unit vectors $\bar{v}_i$, $\bar{v}_j$ and $\bar{v}_0$. Although there are various ways of arranging these voltage unit vectors, it is desirable that the vector components of only one phase are changed among the vector components of all the phases in each of the voltage unit vectors. This is because changing the vector components of two phases results in an increased switching loss and an increased voltage variation.

Referring to FIG. 4 again, it will be seen that the vector components of only one phase change in the two adjacent voltage unit vectors, and the vector components of two phases do not simultaneously change in the adjacent voltage unit vectors. Thus, the aforementioned problem is obviated. In the case of the zero vector $\bar{v}_0$, the selection of either $\bar{v}_7$ or $\bar{v}_8$ and the location of the selected zero vector $\bar{v}_0$ are determined in relation to the selected voltage unit vectors $\bar{v}_i$ and $\bar{v}_j$. In this case, the zero vector $\bar{v}_0$ showing the vector component change of one phase only between it and the associated voltage unit vectors is selected and located.

Figure 6A:
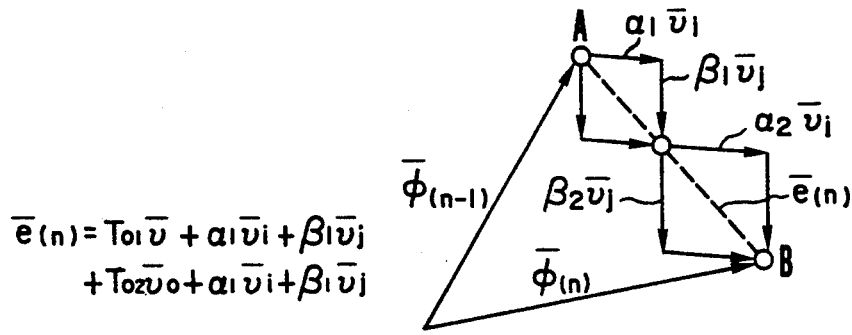
FIGS. 6A, 6B and 6C illustrate how to synthesize the difference vector.
Figure 6B:
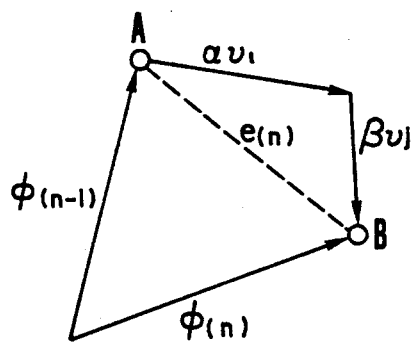
Figure 6C:
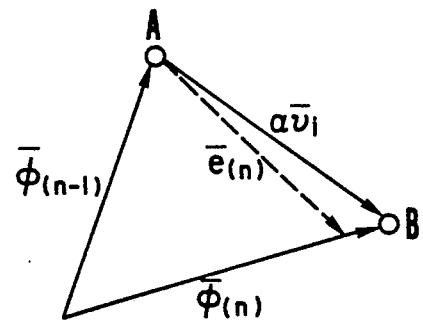

The manner of vector arrangement will be described in more detail with reference to FIGS. 6A, 6B and 6C representing switching modes I, II and III respectively.

Referring to FIG. 6A, the switching mode I designates a mode in which the voltage unit vectors $\bar{v}_i$, $\bar{v}_j$ and $\bar{v}_0$ are divided into m sections to synthesize the voltage vector $\bar{v}(n)$ corresponding to the difference vector $e(n)$. In FIG. 6A, the hold times $\alpha$, $\beta$ and $T_o$ are divided into $\alpha = \alpha_1 + \alpha_2$, $\beta = \beta_1 + \beta_2$ and $T_o = T_{o1} + T_{o2}$ respectively by way of example. The zero vector $\bar{v}_8$ is located at the position indicated by the mark O in FIG. 6A, that is, at the start point or end point of the divided voltage vectors $(\alpha_1 v_i + \beta_1 v_j)$ or $(\beta_2 v_i + \beta_2 v_j)$. For example, when the voltage unit vectors $\bar{v}_3$ (0, 1, 0) and $\bar{v}_4$ (0, 1, 1) are selected as $\bar{v}_i$ and $\bar{v}_j$ respectively, the following vector arrangement is provided according to the switching mode I:

---
$v_7(0, 0, 0) \rightarrow v_3(0, 1, 0) \rightarrow v_4(0, 1, 1) \rightarrow$
$v_8(1, 1, 1) \rightarrow v_4(0, 1, 1,) \rightarrow v_3(0, 1, 0)$
---

Referring to FIG. 6B, the switching mode II designates a mode where the voltage unit vectors $\bar{v}_i$, $\bar{v}_j$ and $\bar{v}_0$ are not divided. In this case too, the zero vector $\bar{v}_0$ is selected and located according to the rule described above. Thus, when, for example, the voltage unit vectors $\bar{v}_3$ (0, 1, 0) and $\bar{v}_4$ (0, 1, 1) are selected as $\bar{v}_i$ and $\bar{v}_j$ respectively, the following vector arrangement is provided:

$$\bar{v}_7 (0, 0, 0) \rightarrow \bar{v}_3 (0, 1, 0) \rightarrow \bar{v}_4 (0, 1, 1)$$

Referring to FIG. 6C, the switching mode III is an exceptional switching mode. As described already, the two adjacent voltage unit vectors $\bar{v}_i$ and $\bar{v}_j$ nearest in direction to the difference vector $\bar{e}(n)$ are selected according to the principle of the present invention, and, in the illustrated embodiment, the combinations of the voltage unit vectors $\bar{v}_i$ and $\bar{v}_j$ corresponding to the various angular ranges of the commanded magnetic flux vector $\bar{\phi}(n-1)$ are previously set as shown in Table 1 so as to simplify the logical and arithmetic processing. Therefore, when the magnitude of the commanded magnetic flux vector $\bar{\phi}(n)$ greatly changes as indicated by $\bar{\phi}'(n)$ or $\bar{\phi}''(n)$ in FIG. 7, the difference vector $\bar{e}(n)$ deviates from within the predetermined angular range defined between the adjacent voltage unit vectors $\bar{v}_i$ and $\bar{v}_j$. In such a situation, these two voltage unit vectors cannot be used to synthesize the difference vector $e(n)$. In such a case, therefore, one of the two voltage unit vectors $\bar{v}_i$ and $\bar{v}_j$ which is nearest in direction to the difference vector $\bar{e}(n)$ is selected alone and used to approximate the difference vector $\bar{e}(n)$, as shown in FIG. 6C representing the switching mode III. In this case too, the zero vector $\bar{v}_0$ is suitably selected and located at the start point or end point of the vector $\bar{v}_i$ or $\bar{v}_j$, as shown in the following equation (15) or (16):

$$\bar{e}'(n) \approx \alpha \bar{v}_i + T_o \bar{v}_0 \qquad (15)$$

$$\bar{e}''(n) \approx \beta \bar{v}_j + T_o \bar{v}_0 \qquad (16)$$

Therefore, in the present embodiment, the switching mode I or II is selected when the difference vector $\bar{e}(n)$ lies inside the angular range defined between the voltage unit vectors $\bar{v}_i$ and $\bar{v}_j$, but the switching mode III is selected when $\bar{e}(n)$ lies outside the above angular range.

The switching mode I or II is selected under the condition specified above. However, the switching mode II is exclusively selected when the zero vector hold times $T_{o1}$ and $T_{o2}$ are shorter than the minimum on-duty time $(T_o)_{min}$ determined by the inherent characteristics of the switching elements of the PWM inverter 1. This is because the turn-off time is required for each of the switching elements of the PWM inverter 1. Thus, when one of the switching elements forming pair with the other switching element on the positive and negative arms respectively of the bridge is turned off, it is necessary to turn on the other switching element with a delay time of $(T_o)_{min}$, thereby preventing objectionable short-circuit trouble. (Such a delay time in the switching state of the switching elements of the inverter is called dead time.) Therefore, this time $(T_o)_{min}$ is absorbed in the hold time $T_o$ or hold times $T_{o1}$ and $T_{o2}$ of the zero vector $\bar{v}_0$.

Also, when the relation $T_o < (T_o)_{min}$ occurs in the switching mode II, the switching mode II is changed over to the switching mode III.

The above conditions for selection of the switching modes I, II and III will be summarized as follows:

1. When the result of decision as to whether or not the difference vector $\bar{e}(n)$ lies inside the angular range defined between the voltage unit vectors $\bar{v}_i$ and $\bar{v}_j$ is:
    (a) "Yes", the switching mode I or II is selected; but
    (b) "No", the switching mode III is selected.
2. When the comparison between the hold times $T_o$, $T_{o1}$, $T_{o2}$ and the time $(T_o)_{min}$ proves that:
    (a) $T_{o1}$, $T_{o2} > (T_o)_{min}$, the switching mode I is selected;
    (b) $T_o > (T_o)_{min} > T_{o1}$, $T_{o2}$, the switching mode II is selected, and
    (c) $T_o$, $T_{o1}$, $T_{o2} < (T_o)_{min}$, the switching mode III is selected.

In the manner described above, the switching mode I, II or III is selected, and the arrangement of the voltage unit vectors $\bar{v}_i$, $\bar{v}_j$ and $\bar{v}_0$ is determined. Then, according to the determined order of arrangement, data for producing the gate signal including the voltage unit vector components and hold times are supplied from the vector arrangement determining means 24 to gate signal producing means 30. In this case, the vector hold times $\alpha$, $\beta$, $T_o$, etc. are converted into corresponding values on a time axis t whose origin is 0 (zero), and such values are supplied to the gate signal producing means 30. Also, in this case, a dead time gate signal component having a length of time $T_d$ corresponding to the value of $(T_o)_{min}$ is also supplied to the gate signal producing means 30.

Figure 8:
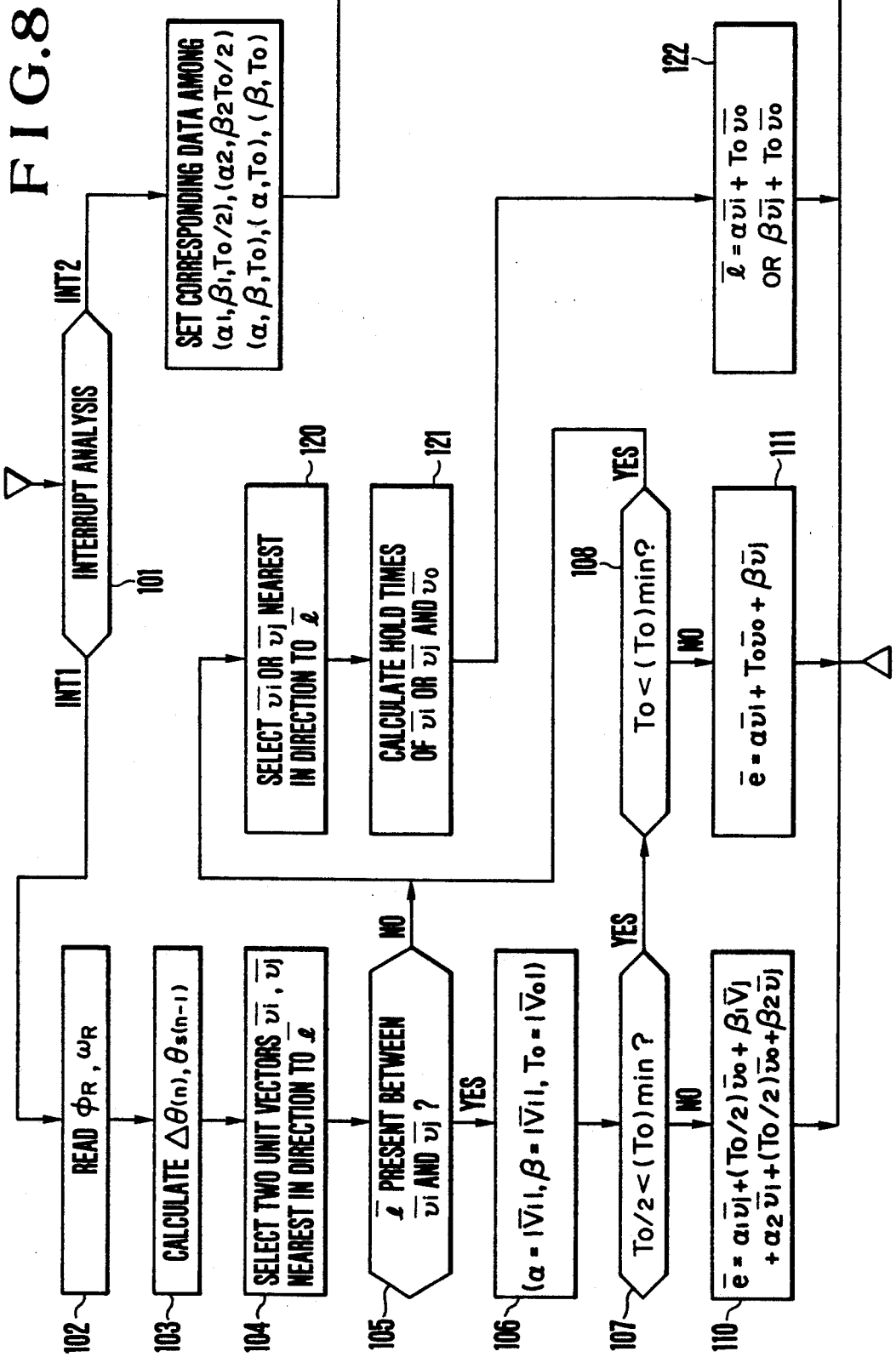
FIG. 8 is a flow chart showing the steps of logical and arithmetic processing executed for synthesizing the difference vector from the voltage unit vectors.

FIG. 8 is a flow chart showing the sequence of logical and arithmetic processing in the pre-processing means 10 and voltage vector synthesizing means 20 described already when the processing is executed by a one-chip microcomputer.

In a step 101 in FIG. 8, an interrupt signal INT is analyzed. When the result of analysis proves that an interrupt signal INT1 is applied, an interrupt in the processing by the aforementioned pre-processing means 10 and voltage vector synthesizing means 20 is requested. On the other hand, when the result of analysis proves that an interrupt signal INT2 is applied, setting of voltage vector data synthesized by the voltage vector synthesizing means 20 in the gate signal producing means 30 is requested.

When the result of analysis in the step 101 proves that the interrupt signal INT1 is applied, the magnetic flux command $\phi_R$ and velocity command $\omega_R$ and read and A/D converted in a step 102. Then, in a step 103, the angle-of-lead $\Delta\theta(n)$ is calculated according to the equation (1), and the rotation angle $\theta_S(n)$ is calculated according to the equation (2). In a step 104, Table 1 is searched to retrieve pre-set two voltage unit vectors $\tilde{v}_i$ and $\tilde{v}_j$ on the basis of the rotation angle $\theta_S(n-1)$ calculated in the preceding sampling. Then, in a step 105, the vector components of the difference vector $\tilde{e}(n)$ are calculated according to the equations (11) and (12), and decision is made as to whether or not the difference vector $\tilde{e}(n)$ lies inside the angular range defined between the voltage unit vectors $\tilde{v}_i$ and $\tilde{v}_j$.

When the result of decision in the step 105 is "Yes", the step 105 is followed by a step 106 in which the hold times $\alpha$, $\beta$ and $T_o$ of the voltage unit vectors $\tilde{v}_i$, $\tilde{v}_j$ and zero vector $\tilde{v}_0$ are calculated according to the equations (13), (14) and (10) respectively. Then, in steps 107 and 108, one of the switching modes I, II and III is selected according to the conditions set forth in 2.

When the switching mode I is selected, the step 107 is followed by a step 110 in which gate signal data based on the manner of divided voltage vector synthesis shown in FIG. 6A are prepared. On the other hand, when the switching mode II is selected, the step 108 is followed by a step 111 in which gate signal data based on the manner of voltage vector synthesis shown in FIG. 6B are prepared.

Further, when the switching mode III is selected, the step 108 is followed by a step 120. This step 120 is the same as the step which is followed by the step 105 when the result of decision is "No". In the step 120, one of the voltage unit vectors $\tilde{v}_i$ and $\tilde{v}_j$ which is nearer in direction to the difference vector $\tilde{e}(n)$ is selected. Then, in a step 121, the hold time $\alpha$ or $\beta$ of the selected one of the voltage unit vectors $\tilde{v}_i$ and $\tilde{v}_j$ and that $T_0$ of the zero vector $\tilde{v}_0$ are calculated. The step 121 is followed by a step 122 in which gate signal data based on the manner of voltage vector synthesis shown in FIG. 6C are prepared.

On the other hand, when the result of analysis in the step 101 proves that the interrupt signal INT2 is applied, prepared gate signal data are set in the gate signal producing means 30.

Figure 9:
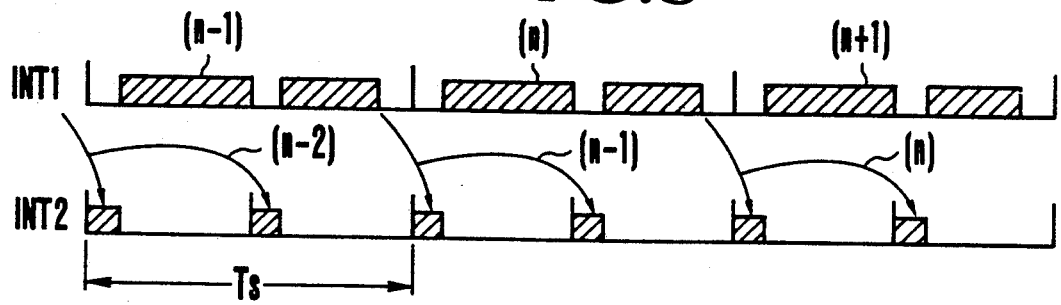
FIG. 9 is a general timing chart of the processing sequence shown in FIG. 8.

FIG. 9 is a time chart showing the timing of interrupt processing by application of the interrupt signals INT1 and INT2 described above. FIG. 9 illustrates the interrupt processing in the case of the switching mode I. It will be seen that the interrupt signal INT1 is activated once in each sampling period $T_S$, and the interrupt signal INT2 is activated twice in each sampling period $T_S$. Gate signal data processed as a result of $(n-1)$-th sampling are set in the gate signal producing means 30 in an n-th sampling period.

Gate signal producing means 30

According to the gate signal data supplied to the gate signal producing means 30, the gate signal producing means 30 applies the corresponding gate signal components to the respective switching elements $S_{UP}$, $S_{VP}$, $S_{WP}$, $S_{UN}$, $S_{VN}$ and $S_{WN}$ of the PWM inverter 1.

Figure 10:
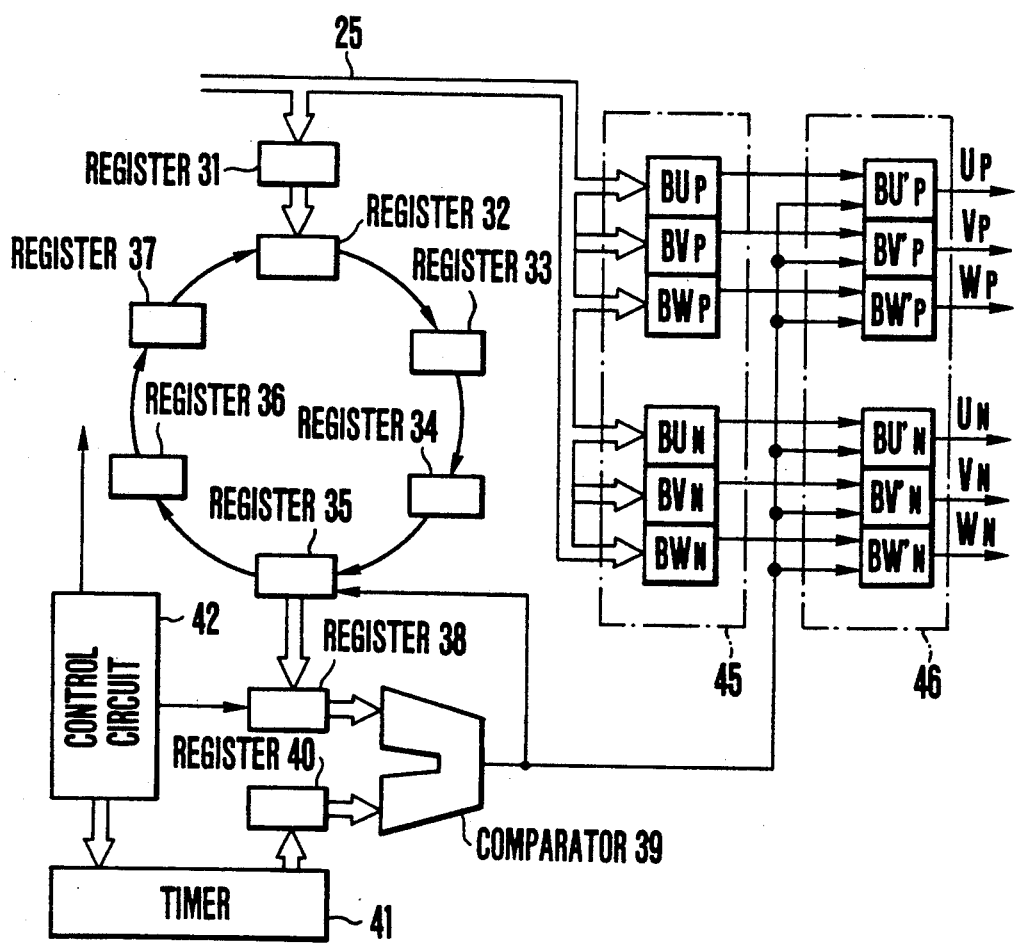
FIG. 10 is a block diagram showing the detailed structure of the gate signal producing means shown in FIG. 2.

FIG. 10 shows the detailed structure of the gate signal producing means 30. Gate signal data prepared by the vector arrangement determining means 24 are set in registers 31 and 45 via an internal bus 25 of the gate signal generating device 6. Data of the hold times $\alpha$, $\beta$, $T_o$, $T_d$ are set in the register 31 together with data of voltage unit vector change-over times $t_1$, $t_2$, $t_3$, - - - determined according to the vector arrangement. These times $t_1$, $t_2$, $t_3$, - - - are counted from an arbitrarily selected reference point 0 (zero) on a time axis and are selected to provide the individual hold times $\alpha$, $\beta$, $T_o$ and $T_d$. Gate signal data (vector components) corresponding to the individual voltage unit vectors are set in the register 45. Therefore, the register 45 includes six elements $BU_P$, $BV_P$, $BW_P$, $BU_P$, $BV_N$ and $BW_N$ corresponding to the respective switching elements $S_{UP}$, $S_{VP}$, $S_{WP}$, $S_{UN}$, $S_{VN}$ and $S_{WN}$ of the PWM inverter 1. Further, this register 45 has, for example, an FIFO (first-in-first-out) register structure so that switching-element on-off signal components corresponding to voltage unit vectors to be generated in each sampling period $T_S$ or half sampling period $\frac{1}{2}T_S$ are sequentially stored therein.

The register 31 is connected at its output to input terminals of registers 32 to 37, and these registers 32 to 37 are connected at their output terminals to an input terminal of a register 38. This register 38 is connected at its output terminal to one of two input terminals of a comparator 39. A register 40 is connected at its output terminal to the other input terminal of the comparator 39. The register 40 is connected at its input terminal to an output terminal of a timer 41. The timer 41 includes a counter which starts its counting operation from the reference time 0 (zero) of the aforementioned vector change-over times $t_1$, $t_2$, $t_3$, - - - on the time axis, so that its count indicates the vector change-over time. The timer 41 is connected at its clock input terminal to a control circuit 42. The control circuit 42 is connected also to control terminals of the registers 32 to 37 and 38.

The comparator 39 is connected at its output terminal to input terminals of six elements $BU_P'$, $BV_P'$, $BW_P'$, $BU_N'$, $BV_N'$ and $BW_N'$ of a register 46. The six elements $BU_P$, $BV_P$, $BW_P$, $BU_N$, $BV_N$ and $BW_N$ of the register 45 are connected at their output terminals to the input terminals of the six elements $BU_P'$, $BV_P'$, $BW_P'$, $BU_N'$, $BV_N'$ and $BW_N'$ of the register 46 respectively.

The operation of the gate signal producing means 30 having such a structure will now be described.

When any one of the registers 32 to 37 becomes empty, the time data stored in the register 31 is transferred from the register 31 to the empty register. The time data stored in each of the registers 32 to 37 is sequentially transferred to the register 38 in response to a control signal applied from the control circuit 42. On the other hand, the time data of the timer 41 is transferred from the timer 41 to the register 40 to update the content of the register 40 with lapse of time. The comparator 39 generates a reset pulse when the time data stored in the register 40 coincides with the content of the register 38. In response to the appearance of this reset pulse, the content of the register 45 is transferred to the register 46, and, at the same time, one of the registers 32 to 37 having transferred its content to the register 38 is cleared. As a result, gate signals components $U_P$, $V_P$, $W_P$, $U_N$, $V_N$ and $W_N$ are applied from the register 46 to the gate circuits of the corresponding switching elements respectively of the PWM inverter 1.

Figure 11:
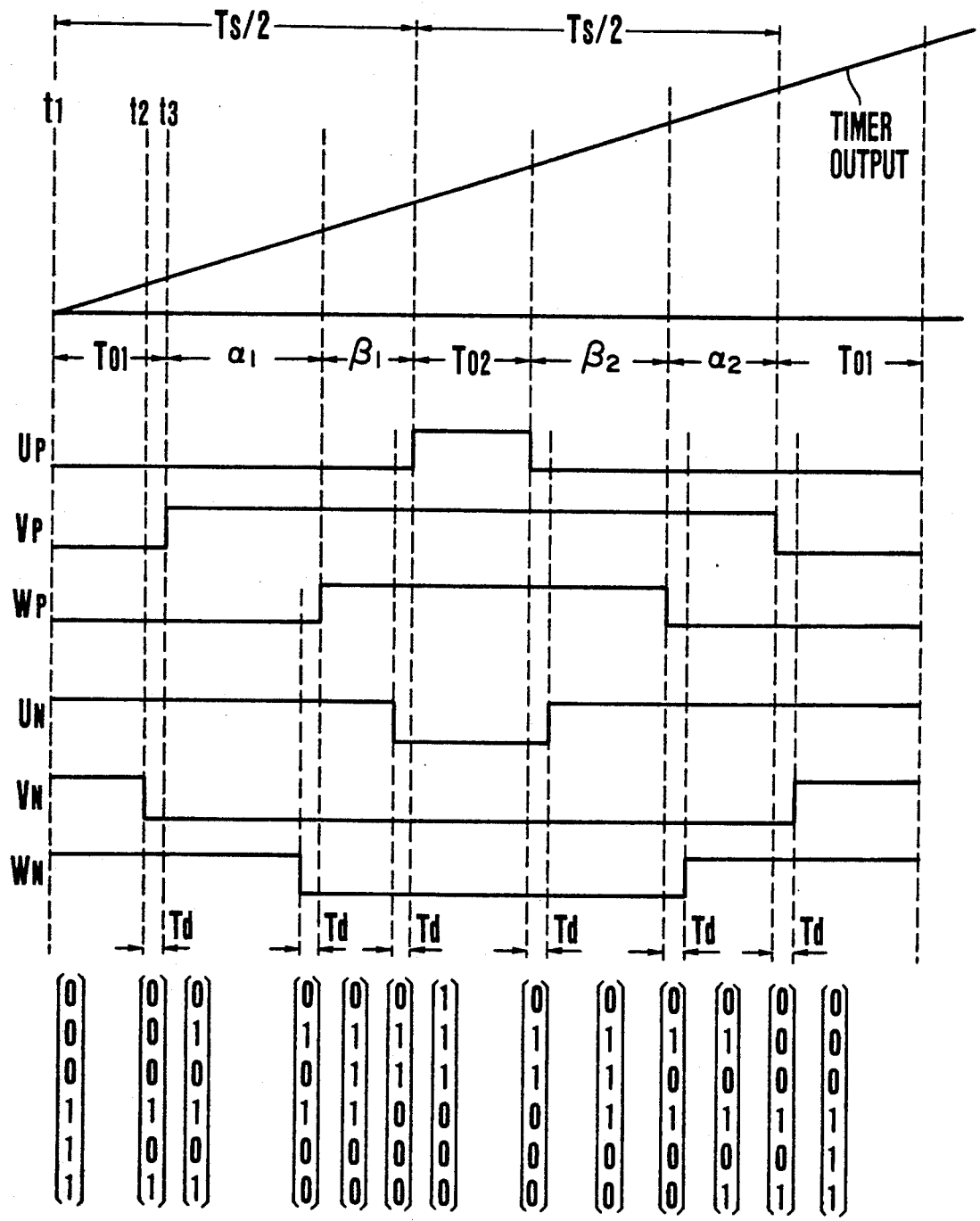
FIG. 11 is a timing chart of the operation of the gate signal producing means shown in FIG. 10.

FIG. 11 is an operation timing chart of the gate signal producing means 30. As described already, the gate signal is the combination of the gate signal components $U_P$, $V_P$, $W_P$, $U_N$, $V_N$, $W_N$ as shown in FIG. 11. Among these gate signal components, the components $U_P$, $V_P$ and $W_P$ have the same expressions as those of the vector components of the voltage unit vectors, while the components $U_N$, $V_N$, $W_N$ have inverted expressions, except that the dead time gate signal components are not inverted.

Before time $t_1$ in FIG. 11, a gate signal (0, 0, 0, 1, 1, 1) is stored already in the register 46. Suppose now that time data $t_2 = t_1 + (T_{o1} - T_d)$ is stored in the register 35, and a dead-time gate signal (0, 0, 0, 1, 0, 1) is stored in the register 45. Then, when the count of the timer 41 indicates $t_2 = t_1 + (T_{o1} - T_d)$, a reset pulse is generated from the comparator 39. As a result, the register 35 is cleared, and, at the same time, the gate signal stored in the register 45 is transferred to the register 46. Consequently, the on-off states of the switching elements of the PWM inverter 1 at time $t_2$ change from (0, 0, 0, 1, 1, 1) to (0, 0, 0, 1, 0, 1).

Then, in response to the output signal of the control circuit 42, the content of the register 34 is transferred to the register 38 to be compared with the count of the timer 41 by the comparator 39. When the result of comparison proves that the content of the register 34 coincides with the count of the timer 41, the next gate signal which is, for example, (0, 1, 0, 1, 0, 1) is generated at time $t_3$ according to the processing sequence described already. On the other hand, when the content of the register 34 does not coincide with the count of the timer 41, the content of one of the remaining registers 32 to 37, which has not been compared yet, is transferred to the register 38 in response to the output signal of the control circuit 42 to be compared with the count of the timer 41. In this case, the count of the timer 41 is held under control of the control circuit 42 until the comparison between the contents of all the registers 32 to 37 and the count of the timer 41 is completed. The count of the timer 41 is incremented because a "1" is added to the count each time a pulse of the clock signal is applied from the control circuit 42 with lapse of time. It will be noted that, during the period of time of addition of a "1" to the count of the timer 41, the comparator 39 can compare the count of the timer 41 with the contents of all the registers 32 to 37.

Thus, as shown in FIG. 11, the gate signal conforming to the gate signal data supplied from the vector arrangement determining means 24 is sequentially applied to the gates of the switching elements of the PWM inverter, so the PWM inverter 1 is driven to produce the rotating magnetic flux commanded by the magnetic flux command $\phi_R$ and velocity command $\omega_R$.

It will be seen from the foregoing description that the illustrated embodiment of the present invention provides various advantages which will now be described.

On the basis of a magnetic flux command $\phi_R$ and a velocity command $\omega_R$ received at an interval of a sampling period $T_S$, a change in the magnitude of and an angle-of-lead of the commanded magnetic flux vector obtained by sampling at the present sampling time relative to those of the commanded magnetic flux vector obtained by sampling at preceding sampling time, that is, a difference vector $\bar{e}(n)$ is calculated, and this difference vector $\bar{e}(n)$ is synthesized using a plurality of voltage unit vectors $\bar{v}$. Then, the gate signal applied to the switching elements of the PWM inverter is produced according to the synthesized voltage vector $\bar{v}(n)$. This logical and arithmetic processing for producing the gate signal after reception of the commands can be executed within each sampling period $T_S$. Therefore, as compared to the prior art apparatus in which the gate signal is produced on the basis of an error vector between a detected value and a target value of a magnetic flux vector, the present invention is advantageous in that the logical and arithmetic processing for producing the gate signal need not be executed at a high speed, and the gate signal that can follow up rotating magnetic flux commands with high accuracy can be generated.

Further, for the synthesis of the difference vector $\bar{e}(n)$, two voltage unit vectors $\bar{v}_i$ and $\bar{v}_j$ nearest in direction to the difference vector $\bar{e}(n)$ are used. Because of the selection of such voltage unit vectors for the synthesis of the difference vector $\bar{e}(n)$, the number of times (the frequency) of switching the switching elements of the PWM inverter within the sampling period $T_S$ can be previously grasped. Therefore, the switching frequency can be suitably controlled so as to decrease thermal losses of the switching elements of the PWM inverter and to rationally determine the heat tolerance of the switching elements.

Further, the zero vector $\bar{v}_0$ is used to adjust the magnitude of the synthesized voltage vector $\bar{v}(n)$ so that the sum of hold times coincides with the sampling period $T_S$. Therefore, the sampling period $T_S$ can be maintained constant, and the circuit structure for controlling the sampling period $T_S$ can be simplified.

According to the switching mode I, the hold times $\alpha$, $\beta$ and $T_0$ of the respective voltage unit vectors $\bar{v}_i, \bar{v}_j$ and $\bar{v}_0$ are each divided into two values for the purpose of synthesis of the synthesized voltage vector $\bar{v}(n)$. Thus, even when the sampling period $T_S$ is constant the switching frequency can be increased according to the number of division of the hold times. Therefore, appearance of ripples in the output voltage of the PWM inverter can be minimized, and generation of audible noise from the a.c. motor can also be minimized.

In the present invention, the combinations of two voltage unit vectors $\bar{v}_i$ and $\bar{v}_j$ used for the synthesis of the difference vector $\bar{e}(n)$ at each or n-th sampling time are previously stored in the form of a table in the ROM together with the values of the corresponding rotation angle $\theta_S(n-1)$ of the magnetic flux vector obtained by sampling at preceding or (n−1)-th sampling time, and this table is retrieved to select the suitable combination of the voltage unit vectors $\bar{v}_i$ and $\bar{v}_j$. Therefore, the processing period of time required for selecting such voltage unit vectors can be shortened. In the illustrated embodiment, the table listing the combinations of the voltage unit vectors $\bar{v}_i$ and $\bar{v}_j$ corresponding to the values of the rotation angle $\theta_S(n-1)$ is shown by way of example. However, it is apparent that, because the angle-of-lead $\Delta\theta(n)$ is actually considerably small, the result is substantially the same as that described above even when the table lists the values of $\Delta\theta(n)$ corresponding to those of $\theta_S(n)$.

It will be understood from the foregoing detailed description of the present invention that, on the basis of a magnetic flux command and a velocity command received at an interval of a sampling period, a change in the magnitude of and an angle-of-lead of the commanded magnetic flux vector obtained by sampling at current the present sampling time relative to those of the commanded magnetic flux vector obtained by sampling at preceding sampling time, that is, the difference vector is calculated, and this difference vector is synthesized using a plurality of voltage unit vectors. Then, the gate signal applied to the gates of the switching elements of the PWM inverter is produced according to the synthesized voltage vector. This logical and arithmetic processing for producing the gate signal after reception of the commands can be executed within each sampling period. Therefore, as compared to the prior art apparatus in which the gate signal is produced on the basis of an error vector between a detected value and a target value of a magnetic flux vector, the present invention is advantageous in that the logical and arithmetic processing for producing the gate signal need not be executed at a high speed, and the gate signal that can follow up rotating magnetic flux commands with high accuracy can be generated.

In the present invention, two voltage unit vectors $\tilde{v}_i$ and $\tilde{v}_j$ nearest in direction to the difference vector are used for the synthesis of the difference vector. Because of the selection of such voltage unit vectors for the synthesis of the difference vector, the number of times (the frequency) of switching the switching elements of the PWM inverter within the sampling period can be previously grasped. Therefore, the switching frequency can be suitably controlled so as to decrease thermal losses of the switching elements of the PWM inverter and to rationally determine the withstand heat capability of the switching elements.

In the present invention, the zero vector $\tilde{v}_0$ is used to adjust the magnitude of the synthesized voltage vector so that the sum of hold times coincides with the sampling period. Therefore, the sampling period can be maintained constant, and the circuit structure for controlling the sampling period can be simplified.

Also, in the present invention, the hold times $\alpha$, $\beta$ and $T_0$ of the respective voltage unit vectors $\tilde{v}_i$, $\tilde{v}_j$ and $\tilde{v}_0$ may be divided into m sections (m: natural number) for the synthesis of the synthesized voltage vector. Thus, even when the sampling period is constant, the switching frequency can be increased according to the number m of division of the hold times. Therefore, appearance of ripples in the output voltage of the PWM inverter can be minimized, and generation of audible noise from the a.c. motor can also be minimized.

In the illustrated embodiment, it is assumed that a difference vector $\bar{e}(n)$ between a magnetic flux vector $\bar{\phi}(n-1)$ obtained by sampling at preceding, that is, (n-1)-th sampling time and a magnetic flux vector $\bar{\phi}(n)$ obtained by sampling at the present, that is, n-th sampling time is regarded to be equal to a difference vector $\bar{e}(n+1)$ between a magnetic flux vector $\bar{\phi}(n+1)$ obtained by sampling at next, that is, (n+1)-th sampling time and the magnetic flux vector $\bar{\phi}(n)$ obtained by sampling at the present n-th sampling time, and, on the basis of the above assumption, the value of a magnetic flux vector $\bar{\phi}(n+1)$ which will be obtained by sampling at the next (n+1)-th sampling time is predicted. Therefore, the value of the magnetic flux vector $\bar{\phi}(n+1)$ which will be obtained by sampling at the next sampling time is calculated by adding the difference vector $\bar{e}(n)$ to the magnetic flux vector $\bar{\phi}(n)$ obtained by sampling at the present sampling time.

However, in the present invention, the magnitude of the magnetic flux vector $\bar{\phi}(n+1)$ obtained by sampling at the next sampling time is assumed to be substantially equal to the magnitude of the magnetic flux vector $\bar{\phi}(n)$ obtained by sampling at the present sampling time, as described already. On the basis of the above assumption, the magnetic flux vector obtained by rotating the magnetic flux vector $\bar{\phi}(n)$ by the rotation angle $\Delta\theta(n)$ may be predicted as the magnetic flux vector $\bar{\phi}(n+1)$ which will be obtained by sampling at the next sampling time. In this case, $\phi_S(n)$ and $\Delta\theta(n)$ may be applied, in lieu of $\phi_S(n-1)$ and $\Delta\theta(n-1)$ respectively, as inputs to the difference vector calculating means 22 shown in FIG. 2. Further, as described already with reference to FIG. 2, $\phi_S(n-1)$ and $\phi_S(n)$ can be regarded to be equal to each other in the calculation of the difference vector according to the equations (11) and (12). Therefore, it will be readily understood that the circuitry of FIG. 2 need not be greatly altered even in such a case.

We claim:

1. A PWM inverter apparatus used for driving an a.c. motor, comprising:

inverter means including an output part connected to said a.c. motor and switching elements on-off controller by a PWM signal;

means for receiving, at an interval of a given sampling period, status command information specifying a vector of a rotating magnetic flux in said a.c. motor;

means for predicting, on the basis of at least said status command information received at each sampled time, a next vector of the rotating magnetic flux which will be produced in said a.c. motor at a next sampling time;

means for calculating a difference vector between the present vector of the rotating magnetic flux specified by said status command information sampled at the present sampling time and the predicted next vector of the rotating magnetic flux;

means for synthesizing said difference vector using selected ones of reference voltage vectors from among a plurality of predetermined reference voltage vectors; and means for generating a PWM signal for controlling said switching elements of said inverter means so as to produce said selected reference voltage vectors.

2. A PWM inverter used for driving an a.c. motor comprising:

inverter means including an output part connected to said a.c. motor and switching elements on-off controlled by a PWM signal;

means for receiving, at an interval of a given sampling period, a magnetic flux command and a velocity command representing desired values of the magnitude and velocity respectively of a vector of a rotating magnetic flux in said a.c. motor;

means for calculating, at each sampling time, a difference vector between a preceding magnetic flux vector corresponding to a preceding magnetic flux command sampled at preceding sampling time and a present magnetic flux vector corresponding to a present magnetic flux command sampled at a present sampling time, on the basis of said preceding magnetic flux vector, said present magnetic flux vector and a rotation angle between said preceding magnetic flux vector and said present magnetic flux vector, said rotation angle being calculated on the basis of a velocity command sampled at the preceding sampling time and said sampling period;

means for synthesizing said difference vector using selected ones of reference voltage vectors from among a plurality of predetermined reference voltage vectors; and means for generating a PWM signal for controlling said switching elements of said inverter means so as to produce said selected reference voltage vectors.

3. A PWM inverter apparatus used for driving an a.c. motor, comprising:

inverter means including an output part connected to said a.c. motor and switching elements on-off controlled by a PWM signal;

means for receiving, at an interval of a given sampling period, a magnetic flux command and a velocity command representing desired values of the magnitude and velocity respectively of a vector of a rotating magnetic flux in said a.c. motor;

means for predicting, at each sampling time, a next vector of a magnetic flux corresponding to a magnetic flux command which will be sampled at a next sampling time, under assumption that the magnitude of the next magnetic flux vector is equal to that of a present magnetic flux vector corresponding to a magnetic flux command sampled at a present sampling time and that the rotation angle between the present magnetic flux vector and the next magnetic flux vector is equal to that calculated on the basis of a velocity command sampled at the present sampling time and said sampling period;

means for calculating a difference vector between said present magnetic flux vector and said predicted next magnetic flux vector;

means for synthesizing said difference vector using selected ones of reference voltage vectors from among a plurality of reference voltage vectors; and means for generating a PWM signal for controlling said switching elements of said inverter means so as to produce.

4. A method of generating a PWM signal in a PWM inverter apparatus which includes inverter means including an output part connected to an a.c. motor and switching elements on-off controlled by the PWM signal and which is used to drive the a.c. motor, comprising the steps of:

receiving, at an interval of a given sampling period, status command information specifying a vector of a rotating magnetic flux in said a.c. motor;

predicting, on the basis of at least said status command information received at each sampling time, a next vector of the rotating magnetic flux which will be produced in said a.c. motor at a next sampling time and calculating a difference vector between a present magnetic flux vector corresponding to said status command information sampled at a present sampling time and said predicted next magnetic flux vector;

synthesizing said difference vector using selected ones of reference voltage vectors from among a plurality of predetermined reference voltage vectors; and generating a PWM signal for controlling said switching elements of said inverter means so as to produce said selected reference voltage vectors.

5. A method of generating a PWM signal in a PWM inverter apparatus which includes inverter means including an output part connected to an a.c. motor and switching elements on-off controlled by the PWM signal and which is used to drive the a.c. motor, comprising the steps of:

receiving, at an interval of a given sampling period, a magnetic flux command and a velocity command representing desired values of the magnitude and velocity respectively of a vector of a rotating magnetic flux in said a.c. motor;

calculating, at each sampling time, a difference vector between a preceding magnetic flux vector corresponding to a preceding magnetic flux command sampled at preceding sampling time and a present magnetic flux vector corresponding to a magnetic flux command sampled at a present sampling time, on the basis of said preceding magnetic flux vector, said present magnetic flux vector and a rotation angle between said preceding magnetic flux vector and said present magnetic flux vector, said rotation angle being calculated on the basis of a velocity command sampled at the preceding sampling time and said sampling period;

synthesizing said difference vector using selected ones of reference voltage vectors from among a plurality of predetermined reference voltage vectors; and generating a PWM signal for controlling said switching elements of said inverter means so as to produce said selected reference voltage vectors.

6. A method according to claim 5, wherein said predetermined reference voltage vectors include six voltage unit vectors $v_1, v_2, v_3, v_4, v_5, v_6$ and two zero vectors $v_7, v_8$ determined by the combinations of on-off states of said switching elements of three-phase bridge arrangement, and said difference vector (e) is synthesized by the use of two voltage unit vectors $v_i$ and $v_j$ which are nearest in direction to said difference vector among said six voltage unit vectors and whose hold times $\alpha$ and $\beta$ are selected to satisfy the following equations:

$$e = \alpha \bar{v}_i + \beta \bar{v}_j$$

$$T_S = \alpha + \beta$$

where $T_S$ represents the sampling period.

7. A method according to claim 5, wherein said predetermined reference voltage vectors include six voltage unit vectors $\bar{v}_1, \bar{v}_2, \bar{v}_3, \bar{v}_4, \bar{v}_5, \bar{v}_6$ and two zero $\bar{v}_7, \bar{v}_8$ determined by the combination of on-off states of said switching elements of three-phase bridge arrangement, and said difference vector ($\bar{e}$) is synthesized by the use of two voltage unit vectors $\bar{v}_i$ and $\bar{v}_j$ nearest in direction to said difference vector among said six voltage unit vectors and also by the use of one of said zero vectors $\bar{v}_0$ ($\bar{v}_7$ or $\bar{v}_8$), said voltage unit vectors $\bar{v}_i, \bar{v}_j$ and having their hold time $\alpha$, $\beta$ and $T_o$ selected to satisfy the following equations:

$$\bar{e} = \alpha \bar{v}_i + \beta \bar{v}_j + T_o \bar{v}_0$$

$$T_S = \alpha + \beta + T_o$$

where $T_S$ represents the sampling period.

8. A method according to claim 7, wherein said hold times $\alpha$, $\beta$ and $T_o$ are each divided into m sections (m: a natural number), and the values of $\alpha_m$, $\beta_m$ and $T_{om}$ (m=1, 2, 3, ---, m) are selected to satisfy the following equations:

$$\bar{e} = \sum_{m=1}^{m} (\alpha_m \bar{v}_i + \beta_m \bar{v}_j + T_{om} \bar{v}_0)$$

$$T_S = \sum_{m=1}^{m} (\alpha_m + \beta_m + T_{om})$$

where $T_S$ represents the sampling period.

9. A method according to claim 8, wherein said zero vector $\bar{v}_0$ is disposed at the start point or end point of said two voltage unit vectors $\bar{v}_i$ and $\bar{v}_j$ in each of said divided sections, and the component of one phase only of said zero vector changes when said zero vector shifts to said voltage unit vector $\bar{v}_i$ or $\bar{v}_j$.

10. A device for generating a PWM signal in a PWM inverter apparatus which includes inverter means including an output part connected to an a.c. motor and switching elements on-off controlled by the PWM signal and which is used to drive the a.c. motor, comprising:

means for receiving, at an interval of a given sampling period, a magnetic flux command and a velocity command representing desired values of the magnitude and velocity respectively of a vector of a rotating magnetic flux in said a.c. motor;

means for calculating, at each sampling time, a difference vector between a preceding magnetic flux vector corresponding to a preceding magnetic flux command sampled at preceding sampling time and a present magnetic flux vector corresponding to a present magnetic flux command sampled at a present sampling time, on the basis of said preceding magnetic flux vector, said present magnetic flux vector and a rotation angle between said preceding magnetic flux vector and said present magnetic flux vector, said rotation angle being calculated on the basis of a velocity command sampled at the preceding sampling time and said sampling period;

means for synthesizing said difference vector using selected ones of reference voltage vectors from among a plurality of predetermined reference voltage vectors; and means for generating a PWM signal for controlling said switching elements of said inverter means so as to produce said selected reference voltage vectors.

11. A device according to claim 10, wherein said plural reference voltage vectors include six voltage unit vectors $\bar{v}_1, \bar{v}_2, \bar{v}_3, \bar{v}_4, \bar{v}_5, \bar{v}_6$ determined by the combinations of on-off states of said switching elements of a three-phase bridge arrangement, and said difference vector synthesizing means includes means for selecting two voltage unit vectors $\bar{v}_i$ and $\bar{v}_j$ nearest in direction to said difference vector $\bar{e}$ from among said six voltage unit vectors, and means for calculating hold times $\alpha$ and $\beta$ of said selected voltage unit vectors $v_i$ and $v_j$ respectively so as to satisfy the following equations:

$$\bar{e} = \alpha \bar{v}_i + \beta \bar{v}_j$$

$$T_S = \alpha + \beta$$

where $T_S$ represents the sampling period.

12. A device according to claim 10, wherein said plural predetermined reference voltage vectors include six voltage unit vectors $\bar{v}_1, \bar{v}_2, \bar{v}_3, \bar{v}_4, \bar{v}_5, \bar{v}_6$ and two zero vectors $\bar{v}_7, \bar{v}_8$ determined by the combinations of on-off states of said switching elements of three-phase bridge arrangement, said difference voltage synthesizing means includes means for selecting two voltage unit vectors $\bar{v}_i$ and $\bar{v}_j$ nearest in direction to said difference vector $\bar{e}$ from among said six voltage unit vectors, and means using said selected voltage unit vectors $\bar{v}_i, \bar{v}_j$ and one of said zero vectors $\bar{v}_0$ for calculating hold times $\alpha$, $\beta$ and $T_0$ of said voltage unit vectors $\bar{v}_i$, $\bar{v}_j$ and said zero vector $\bar{v}_0$ respectively so as to satisfy the following equations:

$$\bar{e} = \alpha \bar{v}_i + \beta \bar{v}_j + T_0 \bar{v}_0$$

$$T_S = \alpha + \beta + T_0$$

where $T_S$ represents the sampling period, and said PWM signal generating means includes means for generating said PWM signal so that said voltage unit vectors $\bar{v}_i, \bar{v}_j$ and said zero vector $\bar{v}_0$ are arranged in the order of $\bar{v}_0.\bar{v}_i.\bar{v}_j$ or $\bar{v}_i.\bar{v}_j.\bar{v}_0$ and have said hold times $\alpha$, $\beta$ and $T_0$ lasting for the corresponding periods respectively.

13. A device according to claim 12, wherein said one zero vector $\bar{v}_0$ is selected so that the component of one phase only of said zero vector changes when said zero vector shifts to the adjacent one of said voltage unit vectors arranged in said order.

14. A device according to claim 12, wherein said hold times $\alpha$, $\beta$ and $T_0$ are each divided by m (m: a natural number larger than 1) thereby obtaining $\alpha'$, $\beta'$ and $T_0'$ so as to satisfy the following equations:

$$\bar{e} = \alpha' m \bar{v}_i + \beta' m \bar{v}_j + T_0' m \bar{v}_0$$

$$T_S = \alpha' m + \beta' m + T_0' m$$

where $T_S$ represents the sampling period, and said PWM signal generating means includes means for generating said PWM signal so that said voltage unit vectors $\bar{v}_i, \bar{v}_j$ and said zero vector $\bar{v}_0$ are repeatedly generated for m cycles in the order of $\bar{v}_i.\bar{v}_j.\bar{v}_0$ or $\bar{v}_0.\bar{v}_i.\bar{v}_j$ and have said hold times $\alpha'$, $\beta'$ and $T_0'$ lasting for the corresponding periods respectively.

15. A device according to claim 14, wherein said difference vector synthesizing means includes means for comparing said hold time $T_0' = T_0/m$ with the minimum onduty time $(T_0)_{min}$ of said switching elements and permitting said hold times $\alpha$, $\beta$ and $T_0$ to be divided by when the relation between $T_0/m$ and $(T_0)_{min}$ is given by $$T_0/m > (T_0)_{min} \qquad \text{(a),}$$

but inhibiting said hold times $\alpha$, $\beta$ and $T_0$ from being divided by m when the relation among $T_0$, $T_0/m$ and $(T_0)_{min}$ is given by $$T_0 > (T_0)_{min} \geq T_0/m \qquad \text{(b).}$$

* * * * *